H. CORY.
FRICTION LINING FOR BRAKES AND CLUTCHES.
APPLICATION FILED SEPT. 13, 1918.
1,324,648.
Patented Dec. 9, 1919.
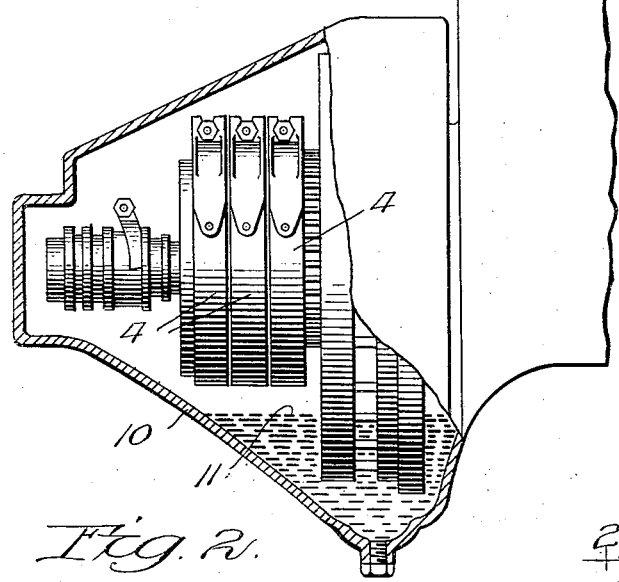
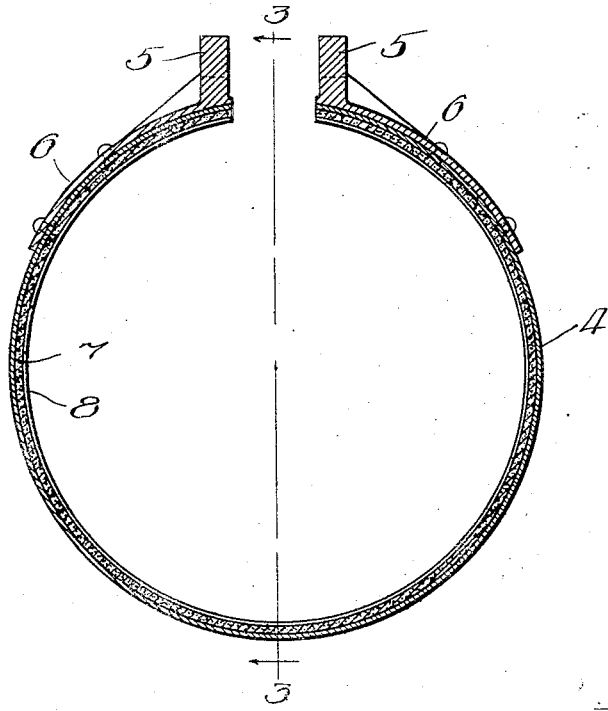
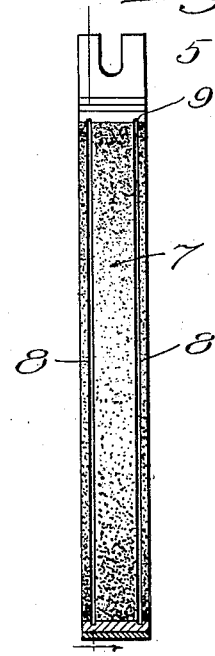
Inventor:
Harvey Cory of the specification.

UNITED STATES PATENT OFFICE.

HARVEY CORY, OF CHICAGO, ILLINOIS.

FRICTION-LINING FOR BRAKES AND CLUTCHES.

1,324,648.  Specification of Letters Patent.  Patented Dec. 9, 1919.

Application filed September 13, 1918. Serial No. 253,887.

*To all whom it may concern:*

Be it known that I, HARVEY CORY, a citizen of the United States, residing at Chicago, in the county of Cook and State of Illinois, have invented certain new and useful Improvements in Friction-Linings for Brakes and Clutches, of which the following is a specification.

In the making of linings for brakes and clutches, it has been found that cork or a composition of cork possesses special advantages over nearly every other material, in that its frictional properties are not impaired when oil is applied thereto. Cork or a composition thereof, if employed in an unoiled condition, tends to burn out and disintegrate when subjected to the high degree of heat incident to use, and a principal object of the present invention, therefore, is to construct a lining in which cork or a cork-like composition is used, and in which provision is made for its proper lubrication, such that the highly desirable frictional properties of cork or a composition thereof may be utilized to advantage. For this purpose, the lining of the present invention is provided with grooves or channels adapted to retain small quantities of oil for cooling purposes and without impairing the frictional properties of the cork itself. By this means I overcome the tendency of the lining to wear or burn out with short use.

Having in mind the above objects, and others as well which will more fully hereinafter appear, my invention consists in the novel arrangement and construction of parts to be presently described and claimed, and which are illustrated in the accompanying drawing wherein—

Figure 1 is a sectional detail of a clutch mechanism—that of a Ford automobile being shown by way of example—exhibiting the housing for the working parts, including the brake or clutch elements employing the friction lining of my invention.

Fig. 2 is a section taken on line 2—2 of Fig. 3 through a brake or clutch band in the form of a split ring having the present lining applied thereto; and Fig. 3 is a section through Fig. 2 taken on line 3—3.

The lining of the present invention is shown as applied to a clutch comprising a band 4 in the form of a split ring to the ends of which are secured upstanding slotted lugs 5—5, each equipped with a foot 6 bolted or otherwise made fast to the band. These parts of the band are intended to coöperate with other elements that need not be illustrated or described, and which act to set the clutch against the drum or the like when friction is to be applied thereto.

The band 4 is provided on its inner side with a lining 7 which is preferably formed, in part at least, of cork, or a cork-like composition, or which makes use of cork, or a composition thereof, on its acting face, the lining being attached to the band by any suitable means. The lining, as shown, is provided on its acting face with one or more channels or grooves 8 (see Fig. 3) which may be of any desired form. The ends of these channels are coterminous with the split ends of the band and are open as at 9 so as to permit ingress of oil thereinto.

The split band, best shown in Fig. 2, is arranged operatively with respect to a clutch and its associated parts, the entire mechanism being housed within a casing 10, as illustrated in Fig. 1. This casing acts as a reservoir for oil, the level of which, designated as 11, may be kept to the desired point. When the mechanism is in operation, certain of the parts are revolved through the oil, so as to have the effect of carrying the oil up in the form of a sheet around the sides of the casing, by which action all of the inclosed mechanism is subjected to a bath or spray of oil. When the clutch is in open or closed position, the oil may enter between the split ends of the band and distribute itself around the lining through the channels or grooves 8, the ends whereof are open to facilitate ingress of the oil. Owing to this construction sufficient lubrication is maintained to preserve the lining against undue wear or heat at all times.

By employing a lining of the character and construction set forth, the frictional properties of cork may be utilized without danger to the lining. It will, of course, be understood that this lining may be used either in brakes or clutches, or in other capacities as well, and I do not intend to limit myself to the use of a lining which is secured to a split band of the character shown. Other adaptations of this invention may easily be made, it being necessary only that the channels or grooves have points of ingress located at points above the level of the oil. It will be further understood that the channels or grooves need not necessarily be continuous for the length of the lining, but may extend through only such portions thereof as it is desired to lubricate according to the present invention.

I claim:

1. A friction lining of corklike material associated with a split band having its ends normally spaced apart, the band and lining being adapted to surround an element rotating about a horizontal axis within an oil reservoir, the ends of the band and lining being situated above the level of the oil within the reservoir, and the acting face of the lining being provided with a peripheral channel whose ends extend through to the ends of the lining, permitting oil to enter thereinto at these points, substantially as described.

2. A friction lining of corklike material adapted to surround an element rotating about a horizontal axis within an oil reservoir, the lining ends being spaced apart and situated above the level of the oil within the reservoir, the acting face of the lining being provided with a channel extending through to the end of the lining and permitting oil to enter thereinto at that point, substantially as described.

HARVEY CORY.

Witness:
J. E. FERGUSION.